(12) United States Patent
Pargmann et al.

(10) Patent No.: US 8,699,541 B2
(45) Date of Patent: Apr. 15, 2014

(54) UNSTABLE OPTICAL RESONATOR DEVICE

(75) Inventors: Carsten Pargmann, Bad Friedrichshall (DE); Thomas Hall, Wildberg (DE)

(73) Assignee: Deutsches Zentrum fuer Luft- und Raumfahrt e.V., Cologne (DE)

( * ) Notice: Subject to any disclaimer, the term of this patent is extended or adjusted under 35 U.S.C. 154(b) by 593 days.

(21) Appl. No.: 12/879,137

(22) Filed: Sep. 10, 2010

(65) Prior Publication Data

US 2011/0069734 A1 Mar. 24, 2011

(30) Foreign Application Priority Data

Sep. 18, 2009 (DE) .......................... 10 2009 029 604

(51) Int. Cl.
*H01S 3/08* (2006.01)

(52) U.S. Cl.
USPC ................... 372/95; 372/40; 372/55; 372/70; 372/108

(58) Field of Classification Search
USPC .......................................................... 372/95
See application file for complete search history.

(56) References Cited

U.S. PATENT DOCUMENTS

| | | | |
|---|---|---|---|
| 4,079,340 A | 3/1978 | Weiner et al. | |
| 4,267,524 A * | 5/1981 | Paxton et al. | 372/95 |
| 5,012,483 A * | 4/1991 | Reintjes et al. | 372/95 |
| 5,392,309 A | 2/1995 | Nishimae et al. | |
| 2002/0012377 A1* | 1/2002 | Suganuma et al. | 372/98 |
| 2005/0195881 A1* | 9/2005 | Hall | 372/95 |

FOREIGN PATENT DOCUMENTS

GB 2276031 A 9/2004

OTHER PUBLICATIONS

Hall et al., "Numerical Studies on a Modified Negative-Branch Confocal Unstable Resonator (MNBUR)," *DLR-German Aerospace Center, Institute of Technical Physics*, Proc. of Spie vol. 6346, 634639, pp. 1-7 (2007).

Pargmann et al., "COIL Emission of a Modified Negative Branch Confocal Unstable Resonator," Appl. Opt. vol. 46, No. 31, pp. 7751-7756 (2007).

* cited by examiner

*Primary Examiner* — Xinning Niu
(74) *Attorney, Agent, or Firm* — Womble Carlyle Sandridge & Rice, LLP

(57) ABSTRACT

An unstable optical resonator device is provided, comprising a spherical back mirror, a spherical outcoupling mirror, wherein a focal point lies between the back mirror and the outcoupling mirror, an optically active medium with a rectangular medium cross-section arranged between the back mirror and the outcoupling mirror, and a scraper, which is arranged between the back mirror and the outcoupling mirror and has a first leg and a second leg located transversely to the first leg, said legs defining a free space with a first side delimited by the first leg and a second side delimited by the second leg, wherein the first side and the second side are orthogonal to one another.

26 Claims, 4 Drawing Sheets

UNSTABLE OPTICAL RESONATOR DEVICE

The present disclosure relates to the subject matter disclosed in, and claims the benefit of, German application number 10 2009 029 604.2 of Sep. 18, 2009, which is incorporated herein by reference in its entirety and for all purposes.

BACKGROUND OF THE INVENTION

The invention relates to an unstable optical resonator device comprising a spherical back mirror, a spherical outcoupling mirror, wherein a focal point lies between the back mirror and the outcoupling mirror and an optically active medium arranged between the back mirror and the outcoupling mirror.

An unstable optical resonator for an optically active medium is known from DE 10 2004 008 640 A1, which comprises a spherical back mirror and a spherical outcoupling mirror, wherein an asymmetric outcoupling in relation to the optical axis occurs.

A laser device is known from DE 43 35 585 C2, in which an outcoupling mirror is provided that has a recess or pass region on its edge, through which a laser light bundle composed of parallel laser beams reflected by a total reflection mirror can exit from the resonator.

A solid-state laser is known from GB 2 276 031 A, which has resonance means for forming an unstable negative-branch resonator in a direction of width and a stable resonator in a direction of thickness of the laser medium.

An unstable optical resonator that has a feedback reflection surface is known from U.S. Pat. No. 4,079,340.

SUMMARY OF THE INVENTION

In accordance with the invention, an unstable optical resonator device is provided, which provides a time-independent mode and in the far field provides an intensity distribution that is not too highly structured, and is usable for optically active media with a rectangular medium cross-section.

In accordance with an embodiment of the invention, the optically active medium has a rectangular medium cross-section and a scraper is arranged between the back mirror and the outcoupling mirror and has a first leg and a second leg located transversely to the first leg, said legs defining a free space with a first side delimited by the first leg and a second side delimited by the second leg, wherein the first side and the second side are orthogonal to one another.

The free space defines an opening, through which light that has passed through the optically active medium can pass through the scraper and can be reflected by an outcoupling mirror.

A scraper with a first leg and a second leg lying transversely thereto can be used for any desired resonator mirror configurations and is universally usable. As a result of this, a cost saving is possible and, moreover, a simple adaptability and adjustability is possible.

The unstable optical resonator device is a negative-branch resonator device with an internal focal point that lies between the back mirror and the outcoupling mirror. It comprises spherical mirrors. A purely unstable resonator is obtained. The problems that arise with a hybrid resonator with a cylindrical mirror are thus removed. No high multimode is formed in a stable direction of the resonator, since such a stable direction is not present. Moreover, the resonator losses are relatively small and the adjustment sensitivity is reduced.

Spherical mirrors that have the tolerances necessary for the resonator operation are relatively easy to obtain and therefore inexpensive.

The scraper with the first leg and the second leg located transversely thereto allows positioning to set an optimised resonator operation by displacement.

Moreover, it is possible in principle to position the scraper between the back mirror and the optically active medium without shading the ray path.

Time-independent modes with an intensity distribution in the far field that is not too highly structured can also be obtained for optically active media with a large cross-section and low gains as a result of the resonator device according to the invention.

In principle, the scraper is arranged between the optically active medium and the outcoupling mirror or is arranged between the optically active medium and the back mirror. With the solution according to the invention, an arrangement between the optically active medium and the back mirror is also possible without shading of the ray path occurring.

An optical axis of the resonator device passes through the free space. An optimised laser beam can be coupled out as a result of this.

Advantageously, the resonator device is unstable in all directions transverse to an optical axis. As a result, a lower number of modes are configured with a simultaneously large cross-section of the active medium.

The scraper is inclined in relation to an optical axis. This enables an asymmetric outcoupling to be achieved in a direction transverse (such as perpendicular, for example) to the optical axis.

In particular, the scraper is inclined to face the back mirror to obtain an optimised outcoupling.

Advantageously, an angle of inclination amounts to 45° in order to obtain an asymmetric outcoupling.

An outcoupling of light transversely to an optical axis is provided and also asymmetric outcoupling is provided. A compact cohesive outcoupling surface can be provided as a result.

It is favourable if the back mirror and the outcoupling mirror are concave facing the optically active medium. This enables a negative-branch resonator with the corresponding advantages to be provided in a simple manner.

It is favourable if the free space has a rectangular area in plan view. As a result of this, the scraper can be optimised with respect to an optically active medium with a rectangular cross-sectional surface. The radiation field is transmitted through the scraper with a rectangular beam surface.

It is additionally favourable if an optical axis of the resonator device and an axis through the optically active medium do not coincide. This results in an optimised outcoupling of light.

In particular, the optical axis and the axis through the optically active medium are displaced in parallel. This results in a cohesive outcoupling surface with reduced diffraction losses because of a shortened boundary surface.

Surfaces of the first leg and the second leg facing the back mirror are outcoupling surfaces. These are mirror surfaces, by means of which light is reflected for outcoupling.

In particular, a compact (cohesive) outcoupling surface in the shape of an L is formed on the scraper. The outcoupling surface is delimited towards an inner surface of the L by the free space. This results in an enlarged outcoupling surface and the far field is thus less highly structured.

A combination of an outcoupling surface of the scraper and the free space preferably has an envelope in plan view, which delimits a rectangle. This allows an optimised adaptation to an optically active medium with a rectangular cross-sectional surface. A compact outcoupling surface can be formed, wherein a far field with less structuring is generated.

In particular, an optical axis runs through a diagonal of the rectangle. This results in an optimised outcoupling of light.

It can be provided in this case that the optical axis is displaced in relation to a diagonal intersection point of the rectangle, wherein a point of intersection of the optical axis is further removed from the first leg and the second leg than the diagonal intersection point. This results in an enlarged radiation field and an enlarged outcoupling surface.

It is favourable if a spacing from an outer edge of the outcoupling surface in the direction of the first leg is at least approximately $X*M/(M+1)$ and in the direction of the second leg is at least approximately $Y*M/(M+1)$, wherein M is a magnification of the resonator device, X is the length of the first leg and Y is the length of the second leg. If the displacement of the point of intersection of the optical axis on the rectangle relative to the diagonal intersection point is selected accordingly, then there results an optimised outcoupling surface with corresponding advantages. In particular, a less structured far field can be obtained as a result.

It is particularly advantageous if the scraper has an L shape at least on the first side and the second side. This results in a simple adaptability to media with a rectangular cross-sectional surface, wherein the scraper is universally usable for different resonator configurations.

In particular, the scraper is open on a side opposite the first side and on a side opposite the second side. An opening that is not delimited on the corresponding sides is provided for the passage of rays as a result.

In particular, a radiation field let through by the scraper has a rectangular cross-section. This results in an optimised outcoupling of light.

It is favourable if a holder is provided, to which the scraper is fixed, wherein by means of the holder the scraper is lockably displaceable in at least two directions transversely to an optical axis of the resonator device and/or the scraper is lockably displaceable in a diagonal direction. As a result, when assembling the resonator device a universal scraper can be positioned so that an optimised outcoupling of light is possible.

It is favourable if a radiation-restricting aperture is arranged on the optically active medium to face the back mirror. The passage of light in the resonator device of bundles of rays that do not run through the optically active medium is thus avoided.

It can be provided that the scraper has a surface including the surface of the free space, which is at least as large as a cross-sectional surface of the optically active medium in projection onto the scraper. There results in an optimised outcoupling of light.

In an alternative embodiment, a cross-sectional surface of the optically active medium in projection onto the scraper is located on the free space. The free space defines the transmitted radiation field. If the transmitted radiation field is brought to the size of the active medium (with respect to the medium cross-sectional surface), then the outcoupling surface increases and the far field is less highly structured.

The scraper is then arranged between the back mirror and the optically active medium.

The resonator device according to the invention can be advantageously used in a laser device and in particular a gas laser device.

The following description of preferred embodiments serves to explain the invention in more detail in association with the drawings.

DETAILED DESCRIPTION OF THE INVENTION

Figure 1:
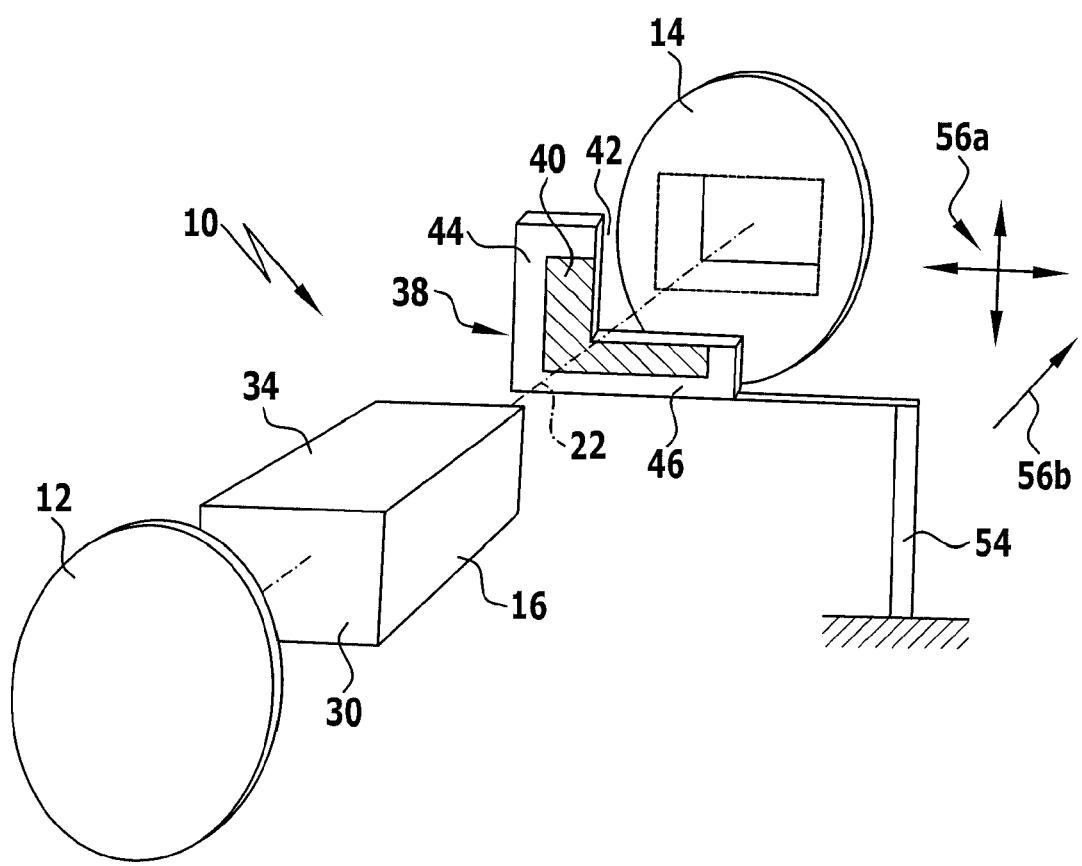
FIG. 1 is a schematic perspective illustration of a first exemplary embodiment of a resonator device according to the invention.
Figure 2:
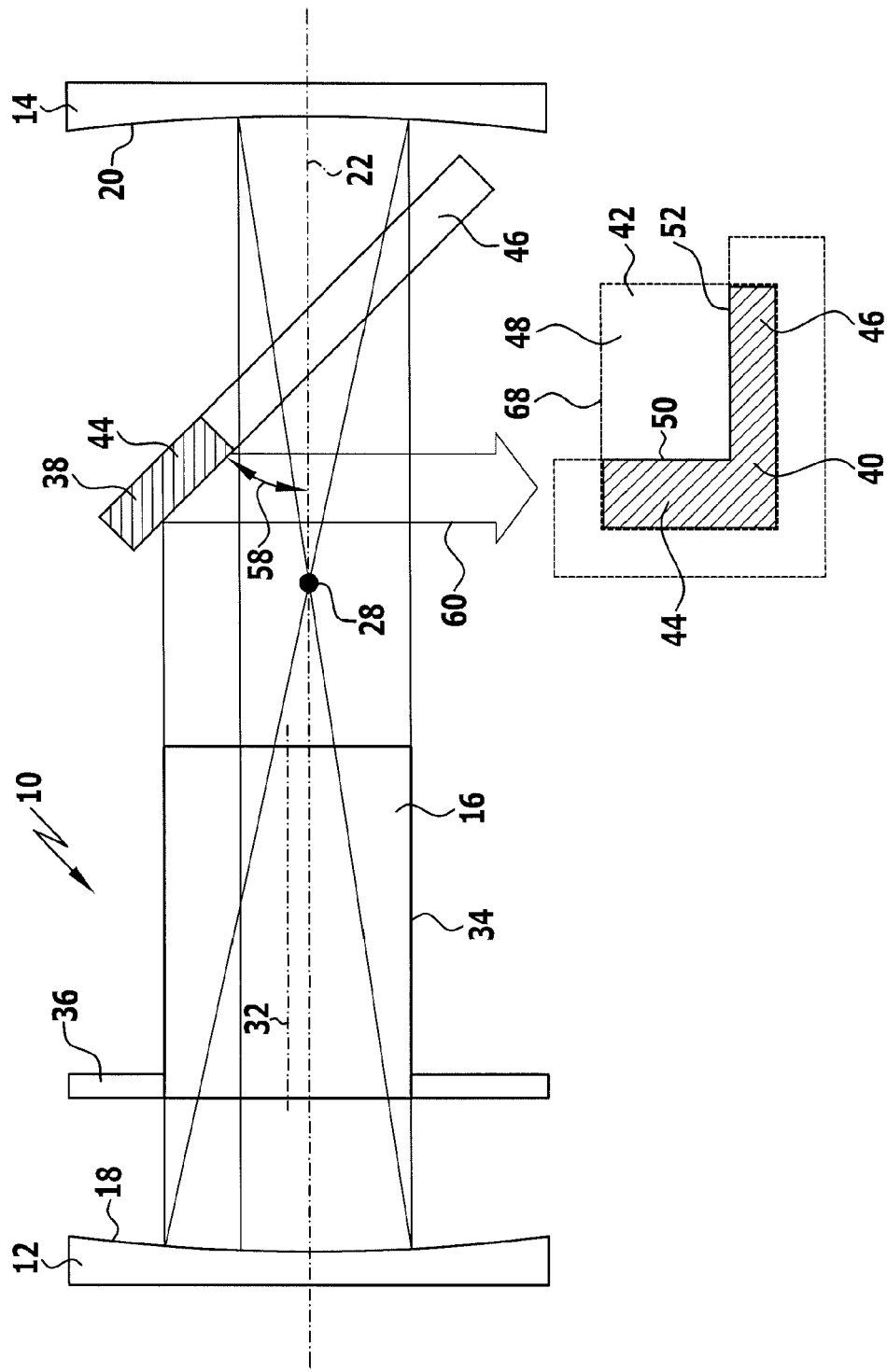
FIG. 2 is a plan view onto the resonator device according to FIG. 1.

A first exemplary embodiment of a resonator device in accordance with the invention, which is shown schematically in FIGS. 1 and 2 and given the reference 10, comprises a first mirror 12 (back mirror) and a second mirror 14 (outcoupling mirror). An optically active medium 16 is arranged between the back mirror 12 and the outcoupling mirror 14. Both the back mirror 12 and the outcoupling mirror 14 are configured spherically facing the optically active medium 16. They respectively have a spherical surface 18 or 20 facing the optically active medium 16. This spherical surface 18 or 20 is concave.

The curvatures of (imaginary) spheres, to which the spherical surfaces 18, 20 are envelopes, are different and meet the known criterion for the formation of an unstable resonator.

The resonator device 10 has an optical axis 22. The optical axis 22 lies on a diametral direction both of the sphere, for which the spherical surface 18 is the envelope, and the sphere, for which the spherical surface 20 is the envelope.

A focal point 28 lies between the back mirror 12 and the outcoupling mirror 14 on the optical axis 22. The focal point 28 is thus an internal focal point of the resonator device. Such a resonator device with an internal focal point 28 is also referred to as a negative-branch resonator.

Because of the spherical configuration of the back mirror 12 and the outcoupling mirror 14 the resonator device 10 is an unstable resonator device. The resonator device 10 is purely unstable. It is unstable in all directions transverse to the optical axis 22.

The optically active medium 16 has a rectangular cross-section 30 in a direction transverse to the optical axis 22. (In the sense of this application a square cross-section is a special case of a rectangular cross-section). The optically active medium 16 has an axis 32, which runs through a diagonal intersection point of the cross-sectional surface 30.

In principle, the optically active medium 16 can be a solid body in the case of the rectangular cross-sectional surface 30. It is also possible that the optically active medium is a gas or a liquid. In this case, the cross-sectional surface 30 is defined by a receptacle 34, which receives the optically active medium, or by a flow space, through which the optically active medium flows. In this case, the receptacle 34 or the flow space define the rectangular cross-sectional surface 30 for the optically active medium 16.

The back mirror 12 and the outcoupling mirror 14 have transverse dimensions such that the cross-sectional surface 30 of the optically active medium 16 is completely covered.

A radiation-restricting aperture 36 is optimally associated with the optically active medium 16 to face the back mirror 12. This aperture covers the space around the optically active medium 16 so that it is radiation-tight.

A scraper 38 is arranged between the optically active medium 16 and the outcoupling mirror 14. The scraper 38 is an element with a mirror surface 40, at which radiation can be reflected for coupling out of the resonator device 10. In addition, the scraper 38 has an opening 42, which is transparent to radiation and through which radiation reflected by the back mirror 12 can pass onto the outcoupling mirror 14. In this case, the opening 42 is smaller than the mirror surface of the outcoupling mirror 14 or the same size as the mirror surface.

The scraper 38 has a first leg 44 and a second leg 46 located transversely to the first leg. The first leg 44 and the second leg 46 delimit a free space 48, which forms the opening 42. In this case, the free space 48 has a first side 50, which is delimited by the first leg, and a second side 52, which is delimited by the second leg 46. The first side 50 and the second side 52 lie perpendicularly to one another.

The free space 48 is rectangular, so that the scraper 38 lets through a rectangular radiation field.

The scraper 38 is open on a side opposite the first side 50, i.e. the free space 48 is not delimited there. In addition, the scraper 38 is open on a side opposite the second side 52, i.e. the free space 38 is likewise not delimited there. The scraper 38 has an L-shaped configuration at least on the first side 50 and the second side 52.

The scraper 38 is held on the resonator device 10 by means of a holder 54. In this case, the holder 54 is preferably configured so that the scraper 38 is displaceable in at least two directions transversely to the optical axis 22 for its adjustment and/or is displaceable in a diagonal direction (see below) of the scraper 38. This is indicated in FIG. 1 by reference numerals 56a and 56b.

The scraper 38 is in the form of a plate. It is inclined relative to the optical axis 22. An angle of inclination 58 preferably amounts to 45°. As a result, the mirror surface 40 of the scraper 38 lies at the angle of inclination 58 to the optical axis 22. Optical radiation can be coupled out of the resonator device 10 asymmetrically in a direction transverse and in particular perpendicular to the optical axis 22. Outcoupled light is indicated in FIG. 2 by reference numeral 60.

The scraper 38 is positioned with the first leg 44 and the second leg 46 laterally with respect to the optically active medium 16 such that a projection of the optically active medium 16 lies on the first leg 44 and the second leg 46.

Figure 3:
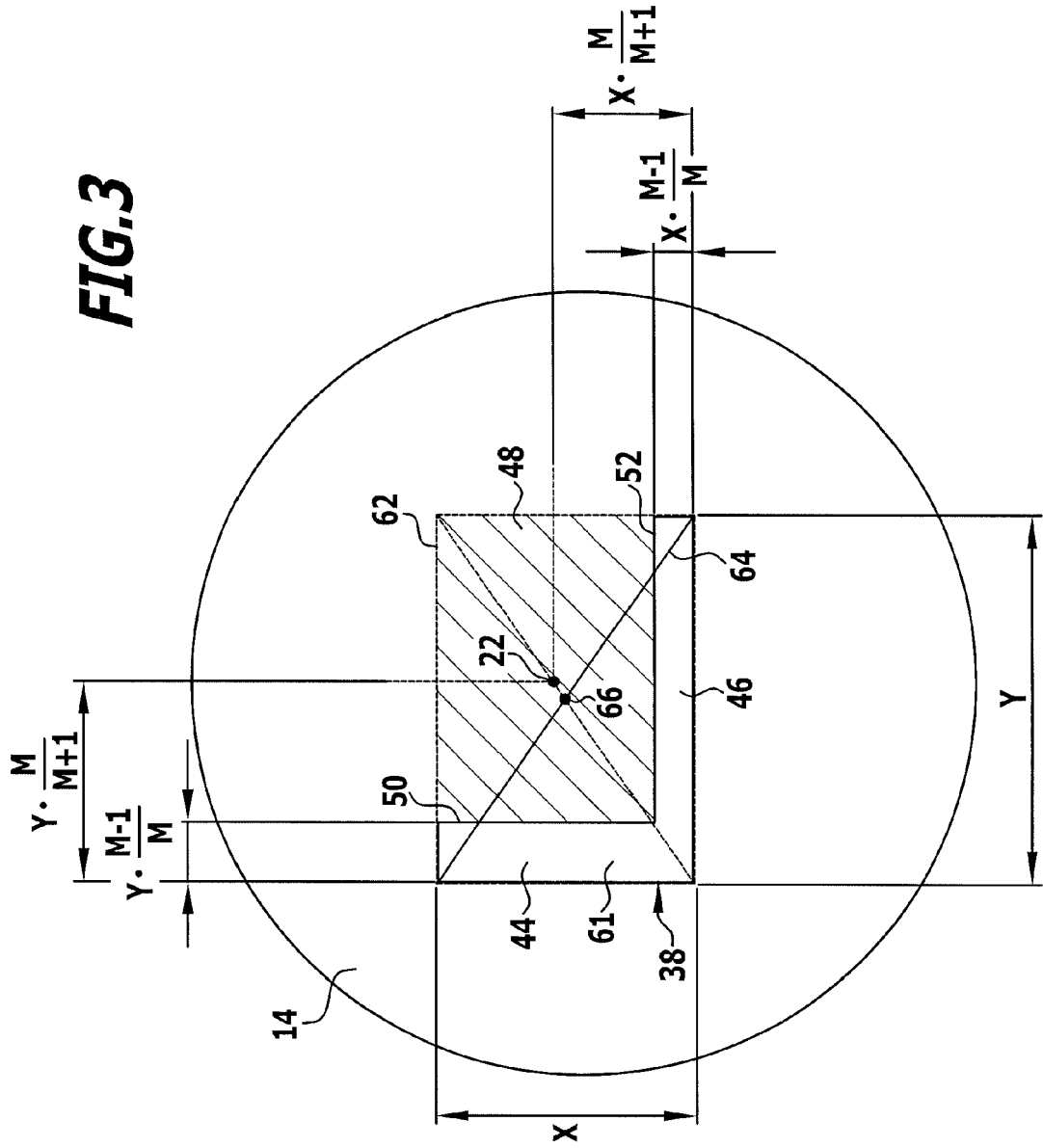
FIG. 3 is a front view of a scraper of the resonator device according to the FIG. 1.

As indicated in FIG. 3, the combination of an outcoupling surface 61 and the free space 48 has a rectangular line as envelope on the scraper 38 and a rectangle 62 is delimited. This rectangle 62 has a diagonal 64 with a diagonal intersection point 66. Both the outcoupling surface 61 and the free space 48 are delimited by the first side 50 and the second side 52.

The axis 32 of the optically active medium 16 is displaced parallel to the optical axis 22 in a direction transverse to the optical axis 22.

The scraper 38 is arranged so that the optical axis 22 does not run through the diagonal intersection point 66 of the scraper 38, but is displaced diagonally. In this case, the point of intersection of the optical axis 22 (compare FIG. 3) is further removed from the first leg 44 and the second leg 46 than the diagonal intersection point 66.

An exemplary embodiment is shown in FIG. 3, in which the outcoupling surface 61 on the first leg 44 has a length X and on the second leg 46 has a length Y. The outcoupling surface 61 on the first leg 44 has a width Y $(1-1/M)$. The outcoupling surface 61 on the second leg 46 has a width X $(1-1/M)$. In the length direction of the first leg 44 the point of intersection of the optical axis 22 is displaced such that it does not lie at (X/2; Y/2), but at (XM/(M+1); YM (M+1). In this case, M is the magnification of the resonator device and is calculated from the ratio of the radii of curvature of the spherical surfaces 18 and 20. M is a geometrically defined magnitude.

Because of the diagonal displacement of the optical axis compared to the diagonal intersection point 66 there results a more compact outcoupling surface 61 with reduced diffraction losses because of a shortened boundary line.

A cross-sectional surface 68 of the optically active medium 16 on the scraper 38 is indicated in FIG. 2. The scraper 38 is configured so that this cross-sectional surface 68 lies on the mirror surface 40 on the first leg 44 and the second leg 46. It is advantageous in this case if the first leg 44 and the second leg 46 have larger dimensions than the cross-sectional surface 68, as indicated in FIG. 2. This enables the scraper 38 to be used universally for different cross-sectional surfaces 68 of the optically active medium 16 and different curvatures of the spherical mirrors 12 and 14. An adaptation is possible through corresponding positioning by means of the holder 54. The L-shaped structure of the scraper 38 ensures that the opening 42 is retained in this case.

The resonator device 10 functions as follows:

Light that has passed through the optically active medium 16 can go through the opening 42 (the free space 48) of the scraper 38 and is reflected by the outcoupling mirror 14. The resonator device 10 is confocal with an internal focal point 28 in this case. The reflected light passes through the optically active medium 16 after reflection. Light passing onto the mirror surface 40 of the scraper 38 is coupled out by the back mirror 12 (outcoupled light 60). The related outcoupling surface 61 on the scraper 38 is L-shaped.

As mentioned above, as a result of the L-shaped configuration of the scraper 38 a scraper type can be used for different resonator devices 10; an optimised outcoupling can be obtained through corresponding positioning.

With the solution according to the invention spherical mirrors and in particular round mirrors can be used for the back mirror 12 and the outcoupling mirror 14. The resonator device is purely unstable (i.e. is unstable in all directions transverse to the optical axis 22). A negative-branch configuration with internal focal point 28 is obtained. As a result, the problems that occur with a hybrid resonator in stable direction can be avoided. In the case of a hybrid resonator with cylindrical mirror a high multimode with an intensity distribution varying in relation to time forms in the stable direction. If the cylindrical mirror is narrow in the plane direction, high resonance losses occur. Moreover, such a resonator is very sensitive to adjustment in stable direction as a result of the plane mirror surfaces.

However, with the solution according to the invention a time-independent mode with an intensity distribution that is also not too highly structured can also be obtained in the case of an optically active medium 16 with a large cross-section and small gain. A good usage of the active medium can be achieved as a result of the confocal arrangement of the back mirror 12 and the outcoupling mirror 14.

The spherical mirrors of the resonator device 10 can be made inexpensively. As mentioned above, the scraper 38 with its L shape can be used for any desired resonator mirror configurations if the cross-sectional surface 30 of the optically active medium 16 is rectangular. This results in high cost savings in particular in the research for ideal resonator data.

As a result of the scraper 38 the optically active medium 16 with rectangular cross-sectional surfaces 30 can also be used optimally with the use of spherical mirrors 12 and 14. For example, there is no need for additional diaphragms to adapt the optical field distribution to the rectangular form.

If the legs 44 and 46 have an appropriate large width and length, the scraper 38 with its L shape is universal for the resonator type.

Figure 4:
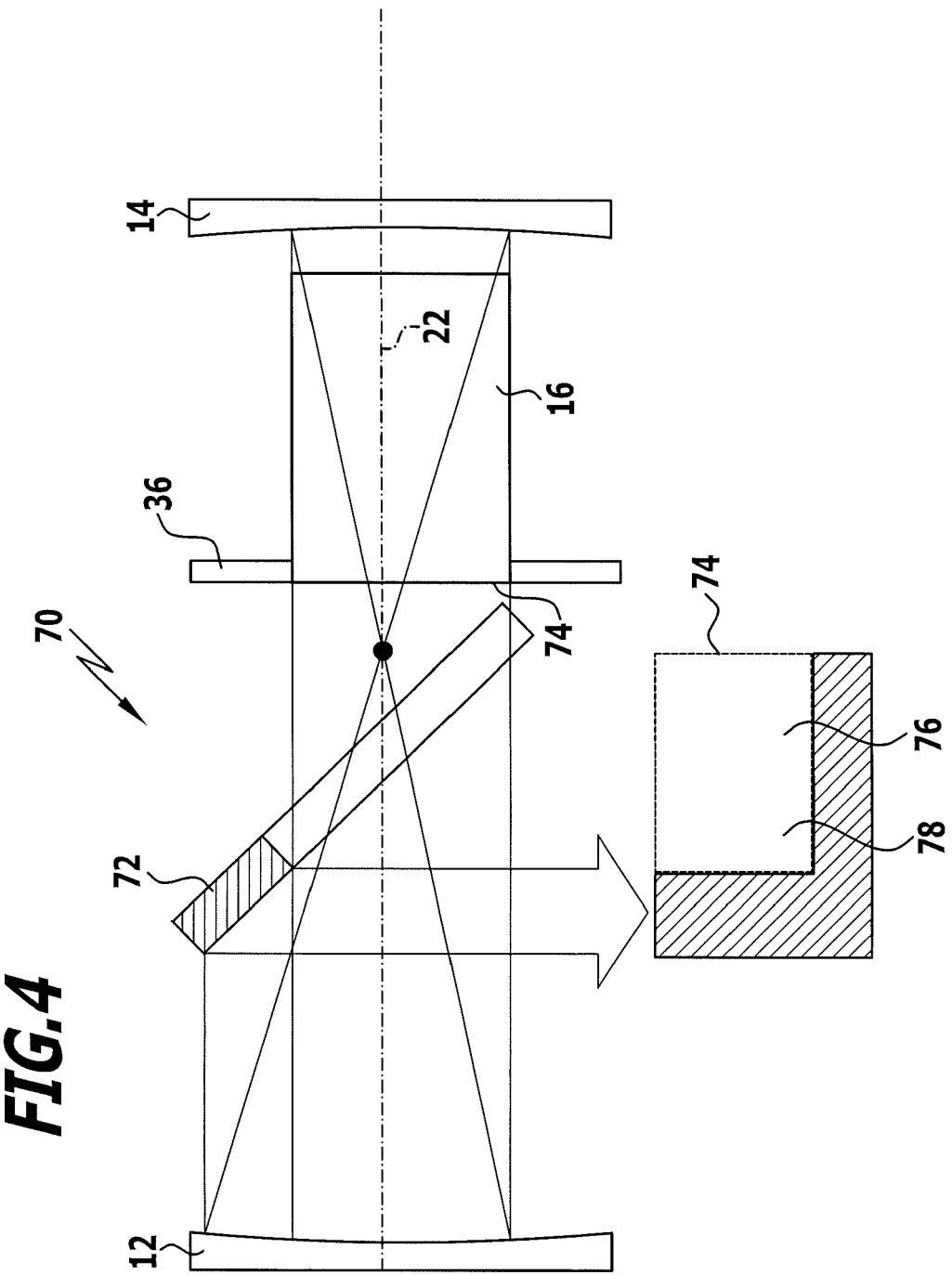
FIG. 4 is a schematic illustration of a second exemplary embodiment of a resonator device according to the invention in plan view.

In a second exemplary embodiment of a resonator device according to the invention, which is shown in FIG. 4 and given the reference 70 there, a scraper 72 is provided that is arranged between the back mirror 12 and the optically active medium 16. (The same reference numerals are used for the same elements as in the case of resonator device 10).

The scraper 72 is inclined to face the mirror 12.

In the case of an unstable resonator device 70 with internal focal point (negative-branch) such an arrangement of the scraper 72 between the back mirror 12 and the optically active medium 16 is possible without shading of the path of rays occurring.

In principle, the scraper 72 is configured like scraper 38 with an L-shaped structure.

It is favourable in this case if a cross-section 74 of the optically active medium lies on the free space 76 of the scraper 72. This results in a large outcoupled surface for outcoupling light. A less highly structured far field is obtained as a result.

In this case, the radiation field 78, which passes through the scraper 72, has a rectangular configuration in keeping with the cross-sectional surface 74, wherein this radiation field 78 is brought to the size (the cross-sectional surface) of the optically active medium 16.

The outcoupled beam also has a lower divergence because of the larger outcoupling surface.

The resonator devices according to the invention can be used advantageously in association with optically active media that have a small gain and require a large cross-section. As a result, there can be obtained a time-independent mode and an intensity distribution that is not too highly structured.

Resonator devices according to the invention can be used for gas laser devices, for example. In this connection, attention is drawn to DE 10 2004 008 640 A1 and US 2005/0195881 A1, which are incorporated herein and made a part hereof by reference.

The invention claimed is:

1. Unstable optical resonator device comprising:
   a spherical back mirror;
   a spherical outcoupling mirror;
   wherein a focal point lies between the back mirror and the outcoupling mirror;
   an optically active medium with a rectangular medium cross-section arranged between the back mirror and the outcoupling mirror; and
   a scraper, which is arranged between the back mirror and the outcoupling mirror;
   wherein the scraper has a first leg and a second leg located transversely to the first leg, said legs defining a free space with a first side delimited by the first leg and a second side delimited by the second leg;
   wherein the first side and the second side are orthogonal to one another;
   wherein the scraper has an L shape at least on the first side and the second side; and
   wherein the scraper has a compact outcoupling surface in the shape of an L.

2. Unstable optical resonator device according to claim 1, wherein the scraper is arranged between the optically active medium and the outcoupling mirror or is arranged between the optically active medium and the back mirror.

3. Unstable optical resonator device according to claim 1, wherein an optical axis of the resonator device passes through the free space.

4. Unstable optical resonator device according to claim 1, wherein the resonator device is unstable in all directions transverse to an optical axis.

5. Unstable optical resonator device according to claim 1, wherein the scraper is inclined in relation to an optical axis.

6. Unstable optical resonator device according to claim 5, wherein the scraper is inclined towards the back mirror.

7. Unstable optical resonator device according to claim 5, wherein the angle of inclination amounts to 45°.

8. Unstable optical resonator device according to claim 1, wherein an outcoupling of light takes place transversely to an optical axis.

9. Unstable optical resonator device according to claim 1, wherein the back mirror and the outcoupling mirror are concave facing the optically active medium.

10. Unstable optical resonator device according to claim 1, wherein the free space has a rectangular area in plan view.

11. Unstable optical resonator device according to claim 1, wherein an optical axis of the resonator device and an axis through the optically active medium do not coincide.

12. Unstable optical resonator device according to claim 11, wherein the optical axis and the axis through the optically active medium are displaced in parallel.

13. Unstable optical resonator device according to claim 1, wherein surfaces of the first leg and the second leg facing the back mirror are outcoupling surfaces.

14. Unstable optical resonator device according to claim 1, wherein a combination of an outcoupling surface of the scraper and the free space has an envelope in plan view, which delimits a rectangle.

15. Unstable optical resonator device according to claim 14, wherein an optical axis runs through a diagonal of the rectangle.

16. Unstable optical resonator device according to claim 15, wherein the optical axis is displaced in relation to a diagonal intersection point of the rectangle, wherein a point of intersection of the optical axis is further removed from the first leg and the second leg than the diagonal intersection point.

17. Unstable optical resonator device according to claim 16, wherein a spacing from an outer edge of the outcoupling surface in the direction of the first leg is at least approximately $X*M/(M+1)$ and in the direction of the second leg is at least approximately $Y*M/(M+1)$, wherein M is a magnification of the resonator device, X is the length of the first leg and Y is the length of the second leg.

18. Unstable optical resonator device according to claim 1, wherein the scraper is open on a side opposite the first side.

19. Unstable optical resonator device according to claim 1, wherein the scraper is open on a side opposite the second side.

20. Unstable optical resonator device according to claim 1, wherein a radiation field let through by the scraper has a rectangular cross-section.

21. Unstable optical resonator device according to claim 1, wherein a holder is provided, to which the scraper is fixed, wherein by means of the holder at least one of (i) the scraper is lockably displaceable in at least two directions transversely to an optical axis of the resonator device and (ii) the scraper is lockably displaceable in a diagonal direction.

22. Unstable optical resonator device according to claim 1, wherein a radiation-restricting aperture is arranged on the optically active medium to face the back mirror.

23. Unstable optical resonator device according to claim 1, wherein the scraper has a surface including the surface of the free space, which is at least as large as a cross-sectional surface of the optically active medium in projection onto the scraper.

24. Unstable optical resonator device according to claim 1, wherein a cross-sectional surface of the optically active medium in projection onto the scraper lies on the free space.

25. Unstable optical resonator device according to claim 24, wherein the scraper is arranged between the back mirror and the optically active medium.

26. Laser device or gas laser device, comprising an unstable optical resonator, said resonator comprising:
   a spherical back mirror;
   a spherical outcoupling mirror;
   wherein a focal point lies between the back mirror and the outcoupling mirror;
   an optically active medium with a rectangular medium cross-section arranged between the back mirror and the outcoupling mirror; and
   a scraper, which is arranged between the back mirror and the outcoupling mirror;
   wherein the scraper has a first leg and a second leg located transversely to the first leg, said legs defining a free space with a first side delimited by the first leg and a second side delimited by the second leg;
   wherein the first side and the second side are orthogonal to one another;
   wherein the scraper has an L shape at least on the first side and the second side; and
   wherein the scraper has a compact outcoupling surface in the shape of an L.

\* \* \* \* \*